US009769907B2

(12) United States Patent
Koresawa et al.

(10) Patent No.: US 9,769,907 B2
(45) Date of Patent: Sep. 19, 2017

(54) CONTROL SWITCH INCLUDING SENSORS, ACQUISITION CIRCUIT, CHANGE CIRCUIT, AND CONTROL CIRCUIT (71) Applicant: Panasonic Intellectual Property Management Co., Ltd., Osaka (JP)

(72) Inventors: Kouhei Koresawa, Kyoto (JP); Gosuke Sakamoto, Kyoto (JP); Yuka Hasegawa, Kanagawa (JP); Norishige Nanai, Osaka (JP); Takaaki Ukeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/409,517

(22) Filed: Jan. 18, 2017

(65) Prior Publication Data
US 2017/0215254 A1    Jul. 27, 2017

(30) Foreign Application Priority Data

Jan. 27, 2016    (JP) ................................ 2016-013768

(51) Int. Cl.
*H05B 37/02*    (2006.01)
(52) U.S. Cl.
CPC ............................... *H05B 37/0227* (2013.01)
(58) Field of Classification Search
CPC .. H05B 7/02; H05B 37/0227; H05B 37/0272; H05B 39/02; H05B 39/04; H05B 39/041; G06F 3/0485; G06F 3/04855; G06F 3/048
See application file for complete search history.

(56) References Cited

U.S. PATENT DOCUMENTS

| 5,716,129 A * | 2/1998 | Kunen | F21V 23/04 307/116 |
| 2006/0279896 A1* | 12/2006 | Bruwer | H05B 37/0227 361/179 |
| 2012/0268025 A1* | 10/2012 | Chi | H05B 37/029 315/201 |

(Continued)

FOREIGN PATENT DOCUMENTS

| JP | 3-001613 | 1/1991 |
| JP | 5-036621 U | 5/1993 |

(Continued)

*Primary Examiner* — Thai Pham
(74) *Attorney, Agent, or Firm* — McDermott Will & Emery LLP (57) ABSTRACT

A control switch for controlling a level of an operation of an apparatus among operating levels including first, second, and third operating levels includes: sensors each of which, in operation, senses an object, the sensors including first, second, and third sensors arranged along one direction, the first, second, and third sensors being assigned first, second, and third level values, respectively; an acquisition circuit that, in operation, acquires a moving velocity of the object along the direction with the first, second, and third sensors; a change circuit that, in operation, changes at least two of the first, second, and third level values according to the moving velocity; and a control circuit that, in operation, causes the apparatus to operate at an operating level corresponding to the level value assigned to one of the first, second, and third sensors which has sensed the object.

8 Claims, 9 Drawing Sheets

(56) References Cited

U.S. PATENT DOCUMENTS

2015/0089441 A1* 3/2015 Sakayanagi ............ B60K 35/00
　　　　　　　　　　　　　　　　　　　　　　　　715/786
2015/0208487 A1* 7/2015 Kim .................. H05B 37/0227
　　　　　　　　　　　　　　　　　　　　　　　　315/134

FOREIGN PATENT DOCUMENTS

| JP | 2009-301811 | 12/2009 |
| JP | 2014-186931 | 10/2014 |
| JP | 2015-058918 | 3/2015 |

* cited by examiner

CONTROL SWITCH INCLUDING SENSORS, ACQUISITION CIRCUIT, CHANGE CIRCUIT, AND CONTROL CIRCUIT

BACKGROUND

1. Technical Field

The present disclosure relates to a control switch.

2. Description of the Related Art

There has conventionally been known an illuminating apparatus including a plurality of touch sensors. For example, Japanese Unexamined Patent Application Publication No. 2014-186931 discloses an illuminating apparatus including a plurality of touch sensors each assigned an optical output. This illuminating apparatus lights at an optical output assigned to that one of the touch sensors which has detected a touch input.

SUMMARY

In one general aspect, the techniques disclosed here feature a control switch for controlling a level of an operation of an apparatus among operating levels including first, second, and third operating levels, including: sensors each of which, in operation, senses an object, the sensors including first, second, and third sensors, the first, second, and third sensors being arranged in this order at intervals from each other along one direction, the first, second, and third sensors being respectively assigned a first level value corresponding to the first operating level, a second level value corresponding to the second operating level, and a third level value corresponding to the third operating level, the first, second, and third level values being included in level values each corresponding to any of the operating levels, the first, second, and third level values being values that are in ascending or descending order; an acquisition circuit that, in operation, acquires a moving velocity of the object along the direction with the first, second, and third sensors; a change circuit that, in operation, changes at least two of the first, second, and third level values according to the moving velocity; and a control circuit that, in operation, causes the apparatus to operate at an operating level corresponding to the level value assigned to one of the first, second, and third sensors which has sensed the object, wherein: (i) when the moving velocity is lower than a first velocity, the change circuit changes at least two of the first, second, and third level values so that a first level interval between the first level value and the second level value and a second level interval between the second level value and the third level value both become smaller; (ii) when the moving velocity is higher than a second velocity that is higher than the first velocity, the change circuit changes at least two of the first, second, and third level values so that the first level interval and the second level interval both become larger; and (iii) when the moving velocity is equal to or higher than the first velocity and lower than or equal to the second velocity, the change circuit does not change the first, second, or third level value.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

The conventional illuminating apparatus constitutes difficulties in making fine adjustments in optical outputs. Further, the illuminating apparatus requires its user to perform a large amount of operation in order to make a great change in operating level of the illuminating apparatus. Under such circumstances, the conventional illuminating apparatus has needed improvement in operability.

The present disclosure makes it possible to provide a control switch with higher operability for control of the operating level of an apparatus.

A control switch according to an aspect of the present disclosure is a control switch for controlling a level of an operation of an apparatus among operating levels including first, second, and third operating levels, including:

sensors each of which, in operation, senses an object, the sensors including first, second, and third sensors, the first, second, and third sensors being arranged in this order at intervals from each other along one direction, the first, second, and third sensors being respectively assigned a first level value corresponding to the first operating level, a second level value corresponding to the second operating level, and a third level value corresponding to the third operating level, the first, second, and third level values being included in level values each corresponding to any of the operating levels, the first, second, and third level values being values that are in ascending or descending order;

an acquisition circuit that, in operation, acquires a moving velocity of the object along the direction with the first, second, and third sensors;

a change circuit that, in operation, changes at least two of the first, second, and third level values according to the moving velocity; and a control circuit that, in operation, causes the apparatus to operate at an operating level corresponding to the level value assigned to one of the first, second, and third sensors which has sensed the object, wherein:

(i) when the moving velocity is lower than a first velocity, the change circuit changes at least two of the first, second, and third level values so that a first level interval between the first level value and the second level value and a second level interval between the second level value and the third level value both become smaller;

(ii) when the moving velocity is higher than a second velocity that is higher than the first velocity, the change circuit changes at least two of the first, second, and third level values so that the first level interval and the second level interval both become larger; and (iii) when the moving velocity is equal to or higher than the first velocity and lower than or equal to the second velocity, the change circuit does not change the first, second, or third level value.

In the control switch according to the aspect of the present disclosure, the change circuit may include processing circuitry and a memory storing a program, and the program, when executed by the processing circuitry, may cause the change circuit to, (i) when the moving velocity is lower than a first velocity, change at least two of the first, second, and third level values so that a first level interval between the first level value and the second level value and a second level interval between the second level value and the third level value both become smaller and to, (ii) when the moving velocity is higher than a second velocity that is higher than the first velocity, change at least two of the first, second, and third level values so that the first level interval and the second level interval both become larger.

In a case where the assigned level values are fixed, it is difficult to make fine adjustments. Further, in a case where the amount of adjustment of the operating level of the apparatus is large, such as a case of changing the illuminating apparatus from being turned off to being fully turned on, it is necessary, for example, to slide the hand from one end of the plurality of touch sensors to the other end. This makes it necessary to move the hand a longer distance, thus impairing the operability of the control switch.

In the control switch according to the aspect of the present disclosure, the level values assigned to the sensors can be changed. This makes it possible to achieve higher operability for control of the operating level of the apparatus. For example, the operating level can be controlled with high accuracy by assigning a large number of sensors a large number of level values in an operating range within which fine adjustments need to be made. Alternatively, a great change in operating level can be made with a small amount of operation by assigning a small number of sensors a small number of level values within a predetermined operating range. Thus, the control switch according to the aspect of the present disclosure allows for higher operability for control of the operating level of the apparatus.

Further, the control switch according to the aspect of the present disclosure is configured such that the first level value assigned to the first sensor, the second level value assigned to the second sensor, and the third level value assigned to the third sensor are values that are in ascending or descending order.

This makes it possible to make the operating level higher or smaller by sliding the object, such as the hand, by which the control switch is operated, along the direction in which the sensors are arranged. The operating level can be controlled to be high or low according to the moving distance and moving direction of the object.

Further, the control switch according to the aspect of the present disclosure is configured such that when the moving velocity is lower than a first velocity, the change circuit changes at least two of the first, second, and third level values so that a first level interval between the first level value and the second level value and a second level interval between the second level value and the third level value both become smaller.

This makes the level intervals between the sensors smaller than their initial values, thus making it possible to easily make fine adjustments in operating levels of the apparatus. In general, most fine adjustments are made by slowly moving an object such as a hand. For this reason, making the level intervals smaller when the moving velocity of the object is low makes it easy to make fine adjustments, thus making it possible to enhance user operability.

Further, the control switch according to the aspect of the present disclosure is configured such that when the moving velocity is higher than a second velocity that is higher than the first velocity, the change circuit changes at least two of the first, second, and third level values so that the first level interval and the second level interval both become larger.

This makes the level intervals between the sensors larger than their initial values, thus making it possible to make a great change in operating level of the apparatus with a small amount of operation. In general, most large adjustments are made by quickly moving an object such as a hand. For this reason, greatly changing the level intervals when the moving velocity of the object is high makes it possible to make a great change in operating level by only slightly moving the object, thus making it possible to enhance user operability.

Further, the control switch according to the aspect of the present disclosure is configured such that when the moving velocity is equal to or higher than the first velocity and lower than or equal to the second velocity, the change circuit does not change the first, second, or third level value.

This makes it possible to enhance user operability.

Further, in the control switch according to the aspect of the present disclosure, when the level of the operation of the apparatus continues to be one of the operating levels for a predetermined period or longer, the change circuit may further assign one of the level values which corresponds to the one of the operating levels to the one of the sensors which has sensed the object.

As in the case of the conventional illuminating apparatus, in a case where the assigned level values are fixed, there is a risk of a sudden great change in operating level. For example, the illuminating apparatus is turned off in a case where a sensor assigned a level value of "0" has sensed the object when the illuminating apparatus is fully turned on.

The control switch according to the aspect of the present disclosure is configured such that in a case where the sensor has sensed the physical object, the sensor is assigned a level value corresponding to the current operating level when the operating level of the piece of equipment is continues to be the same operating level for the predetermined period or longer. This makes it possible to prevent a sudden great change in operating level. This makes it possible to prevent an unintended change in operating level, for example, at the time of an operation resumption or the like.

Further, in the control switch according to the aspect of the present disclosure, when two of the sensors have sensed the physical object at the same time, the control circuit may cause the apparatus to operate according to the average of two of the level values which are assigned to the two of the sensors.

This makes it possible to adjust the operating level with higher accuracy while reducing the number of sensors. The reduction in the number of sensors leads to reductions in size, weight, and cost of the control switch.

Further, in the control switch according to the aspect of the present disclosure, the acquisition circuit may, in operation, calculate the moving velocity using the time from the sensing of the object by the first sensor to the sensing of the object by the second sensor and the distance from the first sensor to the second sensor.

This eliminates the need for a member dedicated to acquiring the moving velocity, thus making it possible to achieve reductions in size, weight, and cost of the control switch.

Further, in the control switch according to the aspect of the present disclosure, the first, second, and third sensors may be placed at regular intervals and that the first interval and the second interval may be equal to each other.

This makes it easy for a user to understand the correspondence between the level values and the sensors, thus making it possible to enhance user operability.

Further, in the control switch according to the aspect of the present disclosure, the first, second, and third sensors may be aligned in a line.

This makes it only necessary to slide the object along the line, thus making it possible to achieve simpler operation and higher operability.

Further, in the control switch according to the aspect of the present disclosure, each of the sensors may include an electrode that, in operation, detects a change in capacitance generated between the object and that sensor.

Further, in the control switch according to the aspect of the present disclosure, each of the sensors may include a light receiver that, in operation, receives infrared radiation reflected or emitted by the object.

For example, in the case of a contact operation, where direct contact with the control switch brings the hand into a condition of positional stability, fine adjustments are easily made and a malfunction or the like due to an intended operation hardly occurs. Meanwhile, in the case of a non-contact operation, where the hand floats above the control switch, the hand is hardly brought into a condition of positional stability. For this reason, a swing of the hand or body may cause the hand to unintentionally enter the sensing range of an adjacent sensor.

The control switch according to the aspect of the present disclosure makes the level intervals between the sensors smaller, for example, in a case where the moving velocity of the hand is low, thus reducing the amount of change in operation level even if the hand unintentionally enters the sensing range of an adjacent sensor. Therefore, even if there is a change in operating level, a readjustment can be easily made and higher operability can be achieved, as the level intervals have been made smaller.

In the present disclosure, all or a part of any of circuit, unit, device, part or portion, or any of functional blocks in the block diagrams may be implemented as one or more of electronic circuits including, but not limited to, a semiconductor device, a semiconductor integrated circuit (IC) or an LSI (large scale integration). The LSI or IC can be integrated into one chip, or also can be a combination of plural chips. For example, functional blocks other than a memory may be integrated into one chip. The name used here is LSI or IC, but it may also be called system LSI, VLSI (very large scale integration), or ULSI (ultra large scale integration) depending on the degree of integration. An FPGA (field programmable gate array) that can be programmed after manufacturing an LSI or a reconfigurable logic device that allows reconfiguration of the connection or setup of circuit cells inside the LSI can be used for the same purpose.

Further, it is also possible that all or a part of the functions or operations of the circuit, unit, device, part or portion are implemented by executing software. In such a case, the software is recorded on one or more non-transitory recording media such as a ROM, an optical disk or a hard disk drive, and when the software is executed by a processor, the software causes the processor together with peripheral devices to execute the functions specified in the software. A system or apparatus may include such one or more non-transitory recording media on which the software is recorded and a processor together with necessary hardware devices such as an interface.

Embodiments are described in detail below with reference to the drawings.

It should be noted that all of the embodiments described below serve as general or specific examples. Numerical values, shapes, materials, constituent elements, and the locations and topology of the constituent elements, steps, the orders of the steps, and the like that are shown in the embodiment below are examples, and are not intended to limit the present disclosure. Those of the constituent elements in the embodiment below which are not recited in an independent claim representing the most superordinate concept are described as optional constituent elements.

Further, each of the drawings is a schematic view and, as such, is not necessarily strictly illustrated. Therefore, for example, the drawings do not necessarily correspond in scale to each other. Further, substantially the same components are given the same reference numerals throughout the drawings, and duplication of description is omitted or simplified.

Embodiment 1

1. Configuration

Figure 1:
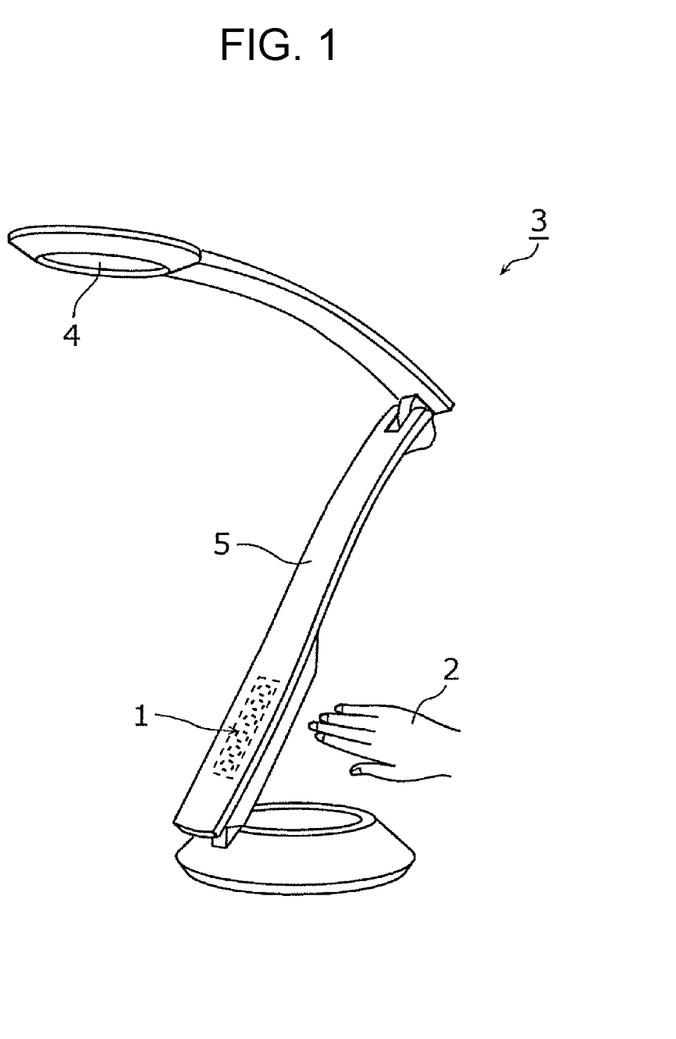
FIG. 1 is a schematic perspective view showing a piece of equipment that a control switch according to Embodiment 1 controls.
Figure 2:
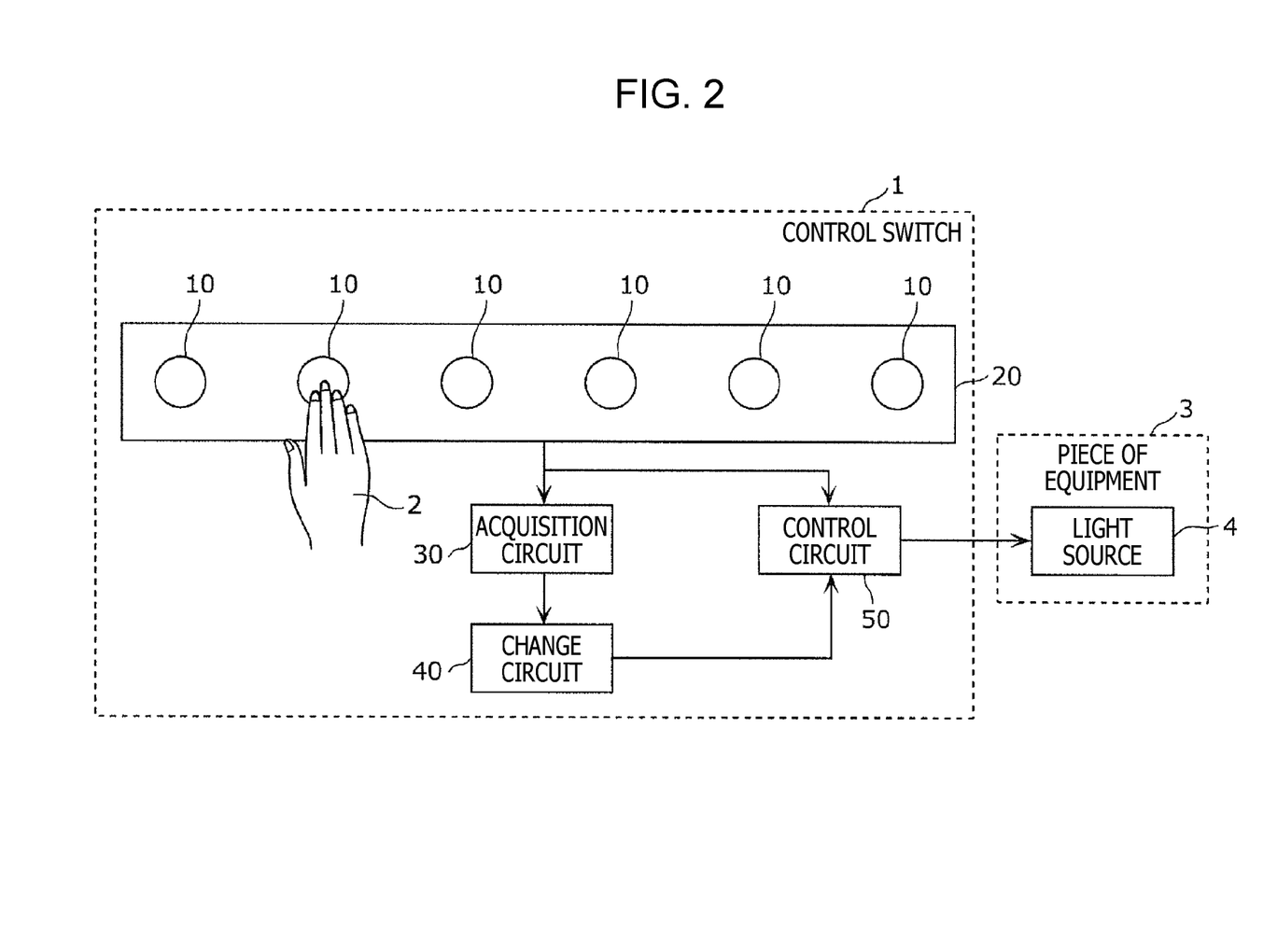
FIG. 2 is a diagram showing a configuration of the control switch according to Embodiment 1.

First, a configuration of a control switch according to Embodiment 1 is described with reference to FIGS. 1 and 2. FIG. 1 is a schematic perspective view showing a piece of equipment 3 that a control switch 1 according to Embodiment 1 controls. FIG. 2 is a diagram showing a configuration of the control switch 1 according to Embodiment 1.

The control switch 1 is for example a level-adjusting control switch for adjusting a level such as the brightness, the toning ratio, or the volume. The control switch 1 controls the operating level of the piece of equipment 3. Specifically, the control switch 1 controls the operating level of the piece of equipment 3 on the basis of results of sensing of a physical object 2 by a plurality of sensors 10. For example, the control switch 1 detects a slide of the physical object 2 with the plurality of sensors 10 and so adjusts the illuminating apparatus according to the direction of the slide thus detected that the illuminating apparatus becomes brighter or darker.

As shown in FIG. 1, the physical object 2 is for example a user's hand or the like. Instead of being a hand, the physical object 2 may be another part of the human body, such as a finger, a foot, or the head, or an object such as a touch pen.

The piece of equipment 3 is a piece of equipment whose operating level is adjustable and which performs a predetermined operation. For example, as shown in FIG. 1, the piece of equipment 3 is an illuminating apparatus that has a light control or toning function. FIG. 1 shows a desk lamp as an example. As shown in FIG. 1, the piece of equipment 3 includes a light source 4 and a stand 5.

The light source 4 is a light source module that includes a light-emitting element such as an LED (light-emitting diode). Instead of including an LED, the light source 4 may include an organic EL (electroluminescence) element or a laser element.

The stand 5 supports the light source 4 and constitutes an outer housing of the piece of equipment 3. The stand 5 is made of a resin material, a metal material, or the like.

It should be noted that the piece of equipment 3 may be any of various types of electronic equipment such as audio equipment or air-conditioning equipment. The piece of equipment 3 operates at the operating level, such as the brightness, the volume, or the temperature, controlled by the control switch 1.

In Embodiment 1, the control switch 1 is provided in the piece of equipment 3. That is, the control switch 1 and the piece of equipment 3 are integrated with each other. Specifically, as shown in FIG. 1, the control switch 1 is disposed inside the stand 5. The stand 5 is provided with an opening, and the control switch 1 is disposed inside the stand 5 so that the plurality of sensors 10 of the control switch 1 are exposed through the opening. It should be noted that the opening may be provided with a cover for protecting the sensors 10.

It should be noted that the control switch 1 may for example be provided in a remote control (not illustrated) that is used for controlling the piece of equipment 3. That is, the control switch 1 and the piece of equipment 3 may communicate with each other wirelessly or by cable.

As shown in FIG. 2, the control switch 1 includes the plurality of sensors 10, a base 20, an acquisition circuit 30, a change circuit 40, and a control circuit 50. The acquisition circuit 30, the change circuit 40, and the control circuit 50 are achieved by circuits such as system LSIs (large-scale integrations) or microcomputers. These circuits are mounted, for example, in the base 20. The following describes the details of the constituent elements of the control switch 1.

1-1. Sensors

Figure 3:
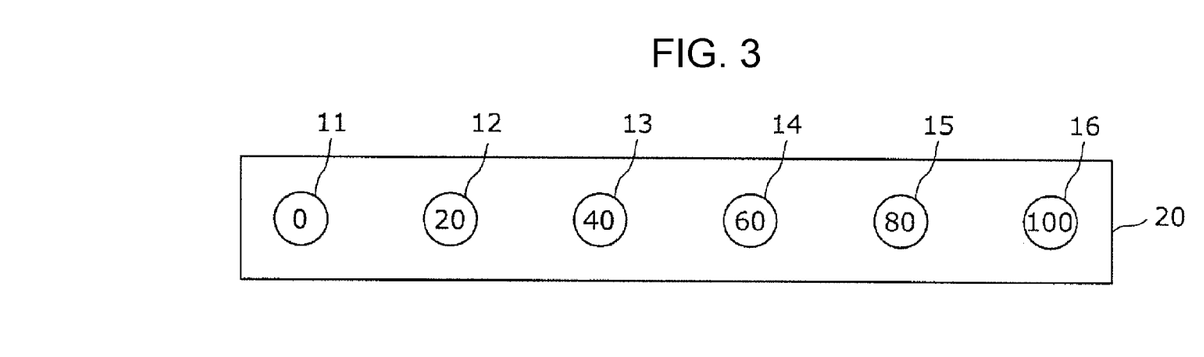
FIG. 3 is a diagram showing examples of level values assigned to a plurality of sensors of the control switch according to Embodiment 1.

The plurality of sensors 10 are placed side by side. Each of the sensors 10 is a sensor that senses the physical object 2. The number of sensors 10 is three or more. Embodiment 1 describes an example where the control switch 1 includes six sensors 11, 12, 13, 14, 15, and 16 as shown in FIG. 3. FIG. 3 is a diagram showing level values assigned to the plurality of sensors 11, 12, 13, 14, 15, and 16 of the control switch 1 according to Embodiment 1. The following description refers to the sensors 11, 12, 13, 14, 15, and 16 as "sensors 10" when they are not particularly differentiated from each other.

The plurality of sensors 10 are placed side by side on the base 20. In Embodiment 1, the plurality of sensors 10 are aligned in a straight line. It should be noted that, instead of being aligned in a straight line, the plurality of sensors 10 may be arranged in a curved line. Alternatively, the plurality of sensors 10 may be arranged in a matrix.

In Embodiment 1, the plurality of sensors 10 are placed side by side at regular intervals. It should be noted that the plurality of sensors 10 do not need to be placed at regular intervals. For example, the plurality of sensors 10 may be placed at intervals each of which becomes larger or smaller than the immediately preceding one along the direction in which the plurality of sensors 10 are arranged.

Each of the sensors 10 is assigned one level value. Specifically, the plurality of sensors 10 are assigned a plurality of level values in a one-to-one correspondence. FIG. 3 shows examples of level values where the numerical values written in the circles representing the six sensors 11, 12, 13, 14, 15, and 16 are assigned to the respective sensors.

In Embodiment 1, the plurality of sensors 10 are assigned a plurality of level values in ascending or descending order along the direction in which the plurality of sensors 10 are arranged. The plurality of sensors 10 are assigned a plurality of level values at equal level intervals in advance. The term "level interval" means the level difference between level values respectively assigned to two adjacent sensors 10.

FIG. 3 shows an example where level values of brightness are assigned. The piece of equipment 3 operates in the range of brightness of "0" (i.e. turned off) to "100" (i.e. fully turned on). The sensor 11, which is located at one end (beginning) in the direction in which the plurality of sensors 10 are arranged, is assigned a level value of "0", and the sensor 16, which is located at the other end (termination), is assigned a level value of "100". The sensors 12, 13, 14, and 15 are assigned level values of "20", "40", "60", and "80", respectively, at regular intervals.

It should be noted that the level values thus assigned may be displayed on or near the plurality of sensors 10. For example, each of the sensors 10 may be provided with a display located near the sensor 10 to display the level value assigned to the sensor 10. The display is a liquid crystal display or the like.

Each of the sensors 10 is a capacitive non-contact sensor including an electrode that detects a change in capacitance generated between the physical object 2 and the sensor 10. The sensor 10 changes in capacitance in a case where the physical object 2 enters the sensing range of the sensor 10. That is, the sensor 10 senses the physical object 2 according to a change in capacitance.

The plurality of sensors 10 are arranged so that their sensing ranges do not overlap each other. For example, the sensing range of each of the sensors 10 lies directly above the sensor 10. That is, when viewed from above, the sensing ranges are the circular ranges of the sensors 10 shown in FIG. 2. It should be noted that the term "directly above (or above)" means a direction normal to a surface of the base 20 on which the sensors 10 are installed. The sensing ranges are not limited to this shape, but may each be in the shape of a polygon, such as a square, or an ellipse.

It should be noted that the plurality of sensors 10 may be sensors that sense the physical object 2 in a non-contact manner. For example, each of the sensors 10 may be an infrared sensor including a light receiver that receives infrared radiation reflected or emitted by the physical object 2. Alternatively, each of the sensors 10 may be a contact sensor such as a touch sensor.

1-2. Base

The base 20 is a member that supports the plurality of sensors 10. The base 20 is for example a plate substrate on a principal surface of which the plurality of sensors 10 are placed side by side. The base 20 is for example a glass substrate, a resin substrate, or the like. The base 20 is not limited to a particular shape or size. The base 20 may be a flexible substrate. For this reason, the plurality of sensors 10 may be placed side by side along a curved surface.

The base 20 is formed with a wiring pattern made of a conductive material such as metal. The wiring pattern provides an electrical connection between each of the sensors 10 and the circuits by which the acquisition circuit 30, the control circuit 50, and the like are achieved. This allows a result of sensing from each of the sensors 10 to be sent to the acquisition circuit 30, the control circuit 50, and the like.

1-3. Acquisition Circuit

The acquisition circuit 30 acquires a moving velocity of the physical object 2 along the direction in which the plurality of sensors 10 are arranged. In Embodiment 1, the acquisition circuit 30 calculates the moving velocity on the basis of the results of sensing of the physical object 2 by the plurality of sensors 10. Specifically, the acquisition circuit 30 calculates the moving velocity using the time from the sensing of the physical object 2 by a first sensor of the sensors 10 to the sensing of the physical object 2 by a second sensor of the sensors 10 that is adjacent to the first sensor and the distance from the first sensor to the second sensor.

Figure 4:
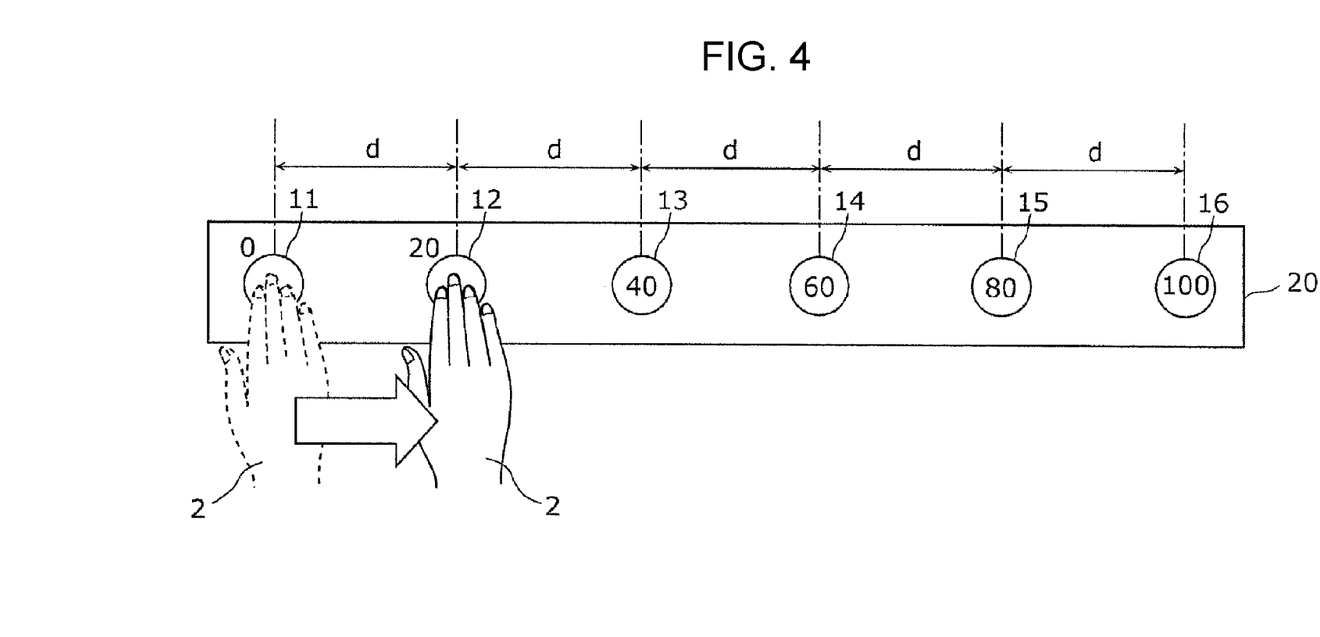
FIG. 4 is a diagram showing a method in which the control switch according to Embodiment 1 acquires a moving velocity of a physical object.

FIG. 4 is a diagram showing a method in which the control switch 1 according to Embodiment 1 acquires the moving velocity of the physical object 2. As shown in FIG. 4, the acquisition circuit 30 acquires, as the moving time t, the time from the sensing of the physical object 2 by the sensor 11 to the sensing of the physical object 2 by the adjacent sensor 12. The acquisition circuit 30 calculates the moving velocity v using the moving time t thus acquired and the distance d between the sensor 11 and the sensor 12. Specifically, the acquisition circuit 30 calculates the moving velocity v (=d/t) by dividing the distance d by the moving time t.

The acquisition circuit 30 is achieved, for example, by a nonvolatile memory storing a calculation program for calculating moving velocities, a volatile memory serving as a temporary storage area for executing the calculation program, an I/O port, a processor that executes the calculation program, and the like.

It should be noted that the acquisition circuit 30 may calculate the moving velocity without using the results of sensing by the sensors 10. For example, the acquisition circuit 30 may be a velocity sensor or an acceleration sensor provided separately from the plurality of sensors 10.

1-4. Change Circuit

The change circuit 40 changes the assignment of level values to the plurality of sensors 10 according to the moving velocity of the physical object 2. Specifically, the change circuit 40 makes the level intervals between the plurality of sensors 10 smaller in a case where the moving velocity is lower than a first velocity, for example. The change circuit 40 makes the level intervals between the plurality of sensors 10 larger in a case where the moving velocity is higher than a second velocity, for example.

More specifically, the change circuit 40 makes the level intervals between the plurality of sensors 10 smaller in a case where the moving velocity is lower than a first velocity v1. The change circuit 40 makes the level intervals between the plurality of sensors 10 larger in a case where the moving velocity is higher than a second velocity v2 that is higher than the first velocity v1. The change circuit 40 does not change the level intervals between the plurality of sensors 10 in a case where the moving velocity is equal to or higher than the first velocity v1 and lower than or equal to the second velocity v2.

The change circuit 40 changes the assignment of level values with reference to a table that associates moving velocities and level intervals with each other. The table is stored in a storage (not illustrated) and associates a plurality of moving velocities and a plurality of level intervals with each other so that there is a positive correlation between the moving velocities and the level intervals. The change circuit 40 chooses a level interval with reference to the table according to the moving velocity acquired by the acquisition circuit 30 and changes the assignment of level values so that the level interval between two adjacent sensors is the level interval thus chosen.

The change circuit 40 is achieved, for example, by a nonvolatile memory storing an assignment program for assigning level values, a volatile memory serving as a temporary storage area for executing the assignment program, an I/O port, a processor that executes the assignment program, and the like.

1-5. Control Circuit

The control circuit 50 causes the piece of equipment 3 to operate at an operating level corresponding to the level value assigned to that one of the sensors 10 which has sensed the physical object 2. In Embodiment 1, the control circuit 50 controls the light source 4 of the piece of equipment 3. The control circuit 50 and the light source 4 are connected to each other by cable or wirelessly. The control circuit 50 controls the brightness, which is the operating level of the light source 4, by transmitting a control signal representing a level value to the light source 4 by cable or wirelessly. Upon receiving the control signal from the control circuit 50, the light source 4 operates at an operating level corresponding to the level value represented by the control signal.

As one example, assume a case where the physical object 2 is located within the sensing range of the sensor 15 and the sensor 15 has sensed the physical object 2. In this case, the control circuit 50 transmits, to the light source 4, a control signal representing the level value of "80" assigned to the sensor 15. Upon receiving the control signal representing the level value of "80", the light source 4 lights at a brightness of "80".

The control circuit 50 is achieved, for example, by a nonvolatile memory storing a control program for controlling the piece of equipment 3, a volatile memory serving as a temporary storage area for executing the control program, an I/O port, a processor that executes the control program, and the like.

2. Operation

Figure 5:
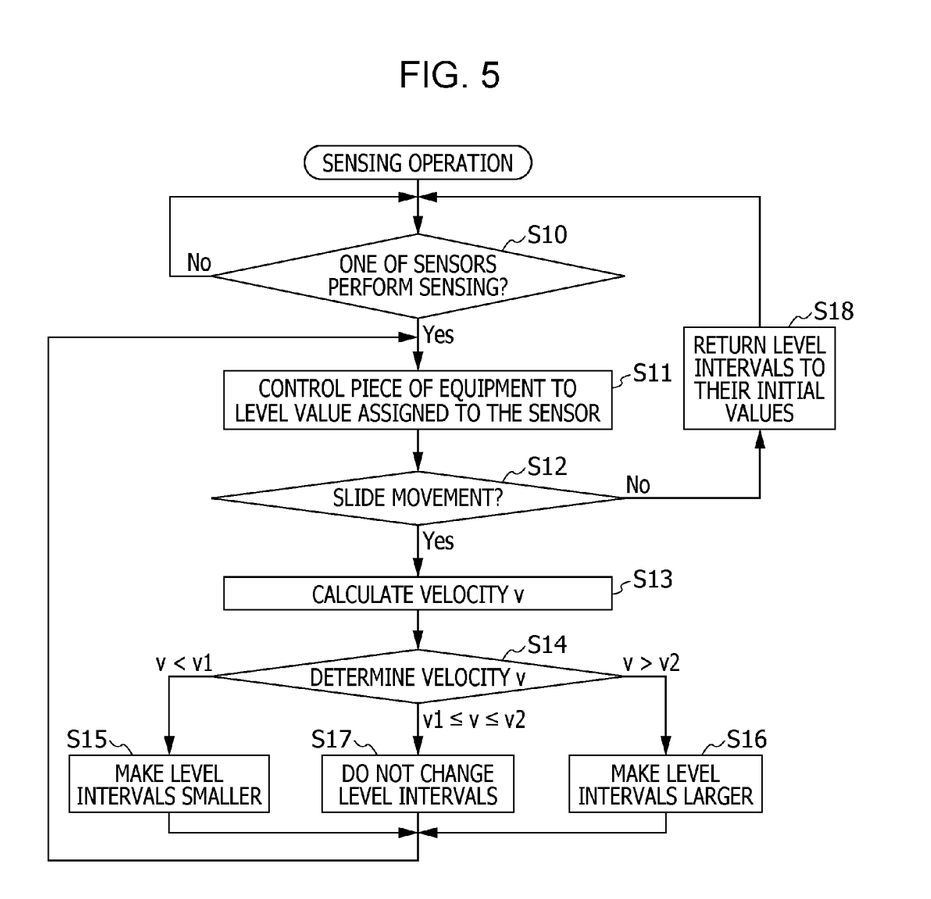
FIG. 5 is a flow chart showing an operation of the control switch according to Embodiment 1.

The following describes an operation of the control switch 1 according to Embodiment 1 with reference to FIG. 5. FIG. 5 is a flow chart showing the operation of the control switch 1 according to Embodiment 1.

First, the control switch 1 waits for one of the sensors 10 to sense the physical object 2 (No in S10). In a case where one of the sensor 10 has sensed the physical object 2 (Yes in S10), the control circuit 50 causes the piece of equipment 3 to operate at the level value assigned to the sensor (S11).

For example, assume a case where the sensor 11 senses the physical object 2 as shown in FIG. 4. The approach of the physical object 2 to the sensor 11 causes a change in capacitance of the sensor 11. When the change in capacitance has exceeded a predetermined threshold, the control circuit 50 determines that the sensor 11 has sensed the physical object 2, thus causing the piece of equipment 3 to operate at the level value of "0" assigned to the sensor 11, i.e. to be turned off.

Next, the control circuit 50 determines whether the physical object 2 is making a slide movement (S12). Specifically, the control circuit 50 determines whether the adjacent sensor 12 senses the physical object 2 within a predetermined period. The predetermined period is for example either not longer than one second or several seconds. In a case where the period from the sensing of the physical object 2 by the sensor 11 to the sensing of the physical object 2 by the adjacent sensor 12 is shorter than the predetermined period, the control circuit 50 determines that the physical object 2 is making a slide movement. In a case where the period from the sensing of the physical object 2 by the sensor 11 to the sensing of the physical object 2 by the adjacent sensor 12 is longer than the predetermined period or in a case where any of the other sensors 13, 14, 15, and 16 has sensed the physical object 2, the control circuit 50 determines that the physical object 2 is not making a slide movement.

In a case where the physical object 2 is making a slide movement (Yes in S12), the acquisition circuit 30 calculates the moving velocity v (S13). Specifically, the acquisition circuit 30 calculates the moving velocity v by dividing the distance d between the sensor 11 and the sensor 12 by the moving time t, which is the time from the sensing of the physical object 2 by the sensor 11 to the sensing of the physical object 2 by the sensor 12.

The change circuit 40 determines the moving velocity v (S14). In a case where the moving velocity v is lower than the first velocity v1 (v<v1 in S14), the change circuit 40 makes the level intervals between the plurality of sensors 10 smaller (S15). After the change of level intervals, the process returns to step S11, in which the piece of equipment 3 operates at an operating level corresponding to the changed level value assigned to the sensor 12.

In a case where the moving velocity v is higher than the second velocity v2 (v>v2 in S14), the change circuit 40 makes the level intervals between the plurality of sensors 10 larger (S16). After the change of level intervals, the process returns to step S11, in which the piece of equipment 3 operates at an operating level corresponding to the changed level value assigned to the sensor 12.

In a case where the moving velocity v is equal to or higher than the first velocity v1 and lower than or equal to the second velocity v2 (v1≤v≤v2 in S14), the change circuit 40 does not change the level intervals between the plurality of sensors 10 (S17). Specifically, the change circuit 40 does not change the level intervals from their initial values, i.e. returns the level intervals to their initial values (S18). Alternatively, in a case where the level intervals have already been changed, the change circuit 40 may maintain the changed level intervals instead of returning the level intervals to their initial values.

In a case where the physical object 2 is not making a slide movement (No in S12), the change circuit 40 returns the plurality of sensors 10 to their initial values (S17). After that, the process returns to step S10, in which the control switch 1 waits for one of the sensors 10 to sense the physical object 2.

In the following, a specific example of the change of level intervals on the basis of the determination of the moving speed v in step S14 is described with reference to FIGS. 6A to 6C. It should be noted that the following describes a case where the plurality of sensors 10 are assigned level values at equal level intervals of "20" in advance as shown in FIG. 4.

2-1. Case where Moving Velocity is Low

Figure 6A:
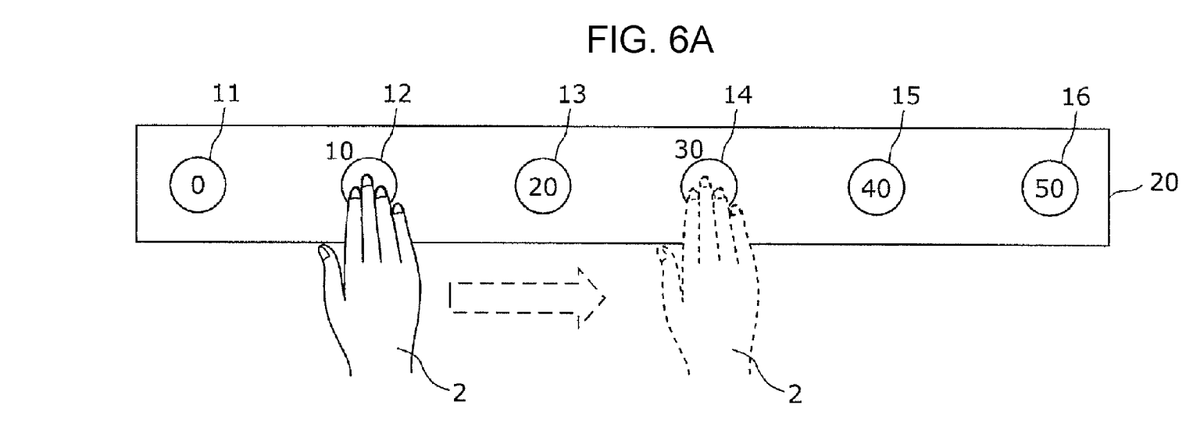
FIG. 6A is a diagram showing examples of level values assigned to the plurality of sensors of the control switch according to Embodiment 1 in a case where the moving velocity of the physical object is low.

FIG. 6A is a diagram showing examples of level values assigned to the plurality of sensors 10 of the control switch 1 according to Embodiment 1 in a case where the moving velocity v of the physical object 2 is low. Specifically, FIG. 6A shows the assignment of level values to which the assignment shown in FIG. 4 has been changed. It should be noted that the numerical values written in the circles representing the six sensors 11, 12, 13, 14, 15, and 16 are examples of level values assigned to the respective sensors. As for the sensors 12 and 14, which are overlapped by the physical object 2, the level values are written right outside the circles. The same applies to FIGS. 6B, 6C, and 8A to 8D, which will be described later.

A comparison between FIG. 4 and FIG. 6A shows that in a case where the moving velocity v is lower than the first velocity v1, the level intervals of "20" are changed to smaller level intervals of "10". In Embodiment 1, with reference to the level value "0" of the sensor 11, which has detected the physical object 2 first, i.e. without changing the level value "0", the change circuit 40 changes the level values of the other sensors 12, 13, 14, 15, and 16 so that each of the level intervals becomes "10". Specifically, as shown in FIG. 6A, the sensors 12, 13, 14, 15, and 16 are assigned level values of "10", "20", "30", "40", and "50", respectively. After the assignment of level values has been changed, the control circuit 50 causes the piece of equipment 3 to operate at an operating level corresponding to the level value of "10" assigned to the sensor 12.

When, after the change of the assignment, the physical object 2 slides over the sensor 13 first and then the sensor 14 as shown in FIG. 6A while maintaining the moving velocity v, the operating level of the piece of equipment 3 changes from a smaller level value of "20" to a larger level value of "30". This finally causes the piece of equipment 3 to operate according to the magnitude of the level value of "30" or, specifically, to light at a brightness of "30".

As described above, the plurality of sensors 10 are assigned level values in the range of "0" to "100" after the change of level intervals (FIG. 6A), whereas the plurality of sensors 10 were assigned level values in the range of "0" to "50" before the change of level intervals (FIG. 4). That is, the range of operating levels that can be controlled by the plurality of sensors 10 has been made narrower.

With the original assignment shown in FIG. 4, the brightness cannot be adjusted to "30", as none of the sensors 10 is assigned a level value of "30". Meanwhile, with the changed assignment shown in FIG. 6A, the brightness can be adjusted to "30", as the sensor 14 is assigned a level value of "30". Thus, the plurality of sensors 10 are assigned a plurality of level values falling within a narrow range, and this makes it possible to make fine adjustments in operating levels, thus allowing for higher operability.

It should be noted that in a case where the physical object 2 changes its moving velocity in the process of making a slide, e.g. moving from the sensor 13 to the sensor 14, the assignment of level values is changed according to the determination made in step S14. Alternatively, in a single slide operation, the assignment of level values may be changed only once. That is, after the assignment of level values has been changed once, the piece of equipment 3 may only be controlled on the basis of a result of sensing without the calculation (S13) or determination (S14) of the velocity, as long as a slide movement is being made.

2-2. Case where Moving Velocity is High

Figure 6B:
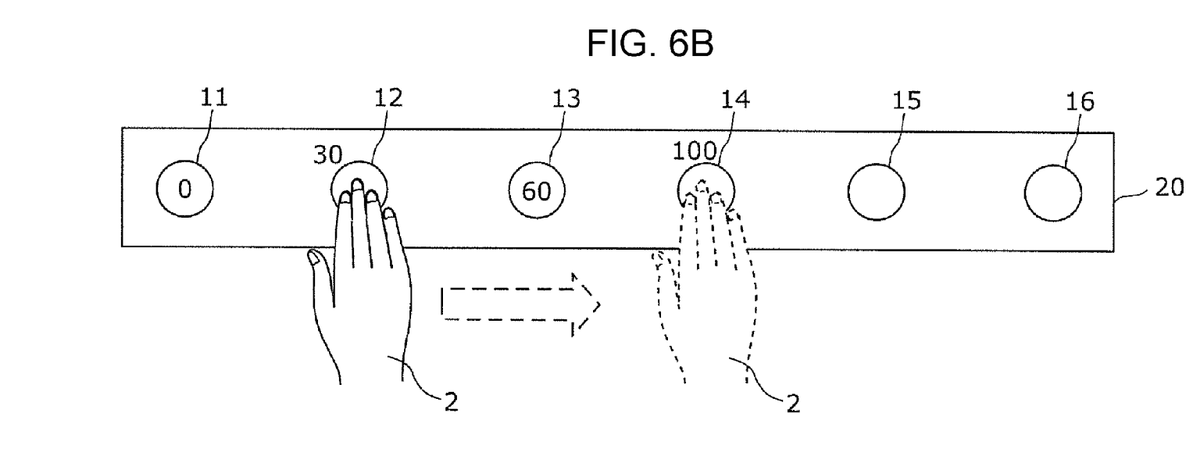
FIG. 6B is a diagram showing examples of level values assigned to the plurality of sensors of the control switch according to Embodiment 1 in a case where the moving velocity of the physical object is high.

FIG. 6B is a diagram showing examples of level values assigned to the plurality of sensors 10 of the control switch 1 according to Embodiment 1 in a case where the moving velocity v of the physical object 2 is high. Specifically, FIG. 6B shows the assignment of level values to which the assignment shown in FIG. 4 has been changed.

A comparison between FIG. 4 and FIG. 6B shows that in a case where the moving velocity v is higher than the second velocity v2, the level intervals of "20" are changed to larger level intervals of "30" or "40". In Embodiment 1, with reference to the level value "0" of the sensor 11, which has detected the physical object 2 first, i.e. without changing the level value "0", the change circuit 40 changes the level values of the other sensors 12, 13, 14, 15, and 16 so that each of the level intervals becomes "30" or "40". Specifically, as shown in FIG. 6B, the sensors 12, 13, and 14 are assigned level values of "30", "60", and "100", respectively. It should be noted that the sensors 15 and 16 do not need to be assigned level values or may be assigned a level value of "100", which is the maximum value. After the assignment of level values has been changed, the control circuit 50 causes the piece of equipment 3 to operate at an operating level corresponding to the level value of "30" assigned to the sensor 12.

When, after the change of the assignment, the physical object 2 slides over the sensor 13 first and then the sensor 14 as shown in FIG. 6B while maintaining the moving velocity v, the operating level of the piece of equipment 3 changes from a smaller level value of "60" to a larger level value of "100". This finally causes the piece of equipment 3 to operate according to the magnitude of the level value of "100" or, specifically, to be fully turned on.

As described above, the four sensors 11, 12, 13, and 14 are assigned level values in the range of "0" to "100" after the change of level intervals (FIG. 6B), whereas the six sensors 11, 12, 13, 14, 15, and 16 were assigned level values in the range of "0" to "100" before the change of level intervals (FIG. 4). That is, the number of sensors 10 required for assigning level values within the predetermined operating range has been made smaller, and the distance from the level value of "0" to the level value of "100" has been made shorter, as the level value of "0" is assigned to the sensor 11 and the level value of "100" is assigned to the sensor 14.

With the original assignment shown in FIG. 4, the physical object 2 must move from the sensor 11 to the sensor 16 to attain the level value of "100". Meanwhile, with the changed assignment shown in FIG. 6B, the physical object 2 needs only move from the sensor 11 to the sensor 14, as the level value "100" is assigned to the sensor 14. In this manner, a great change in operating level can be made even when the physical object 2 moves only a short distance. This makes it possible to reduce the amount of movement of the physical object 2 in making a great change in operating level, thus allowing for higher operability.

2-3. Case where Moving Velocity is Normal

Figure 6C:
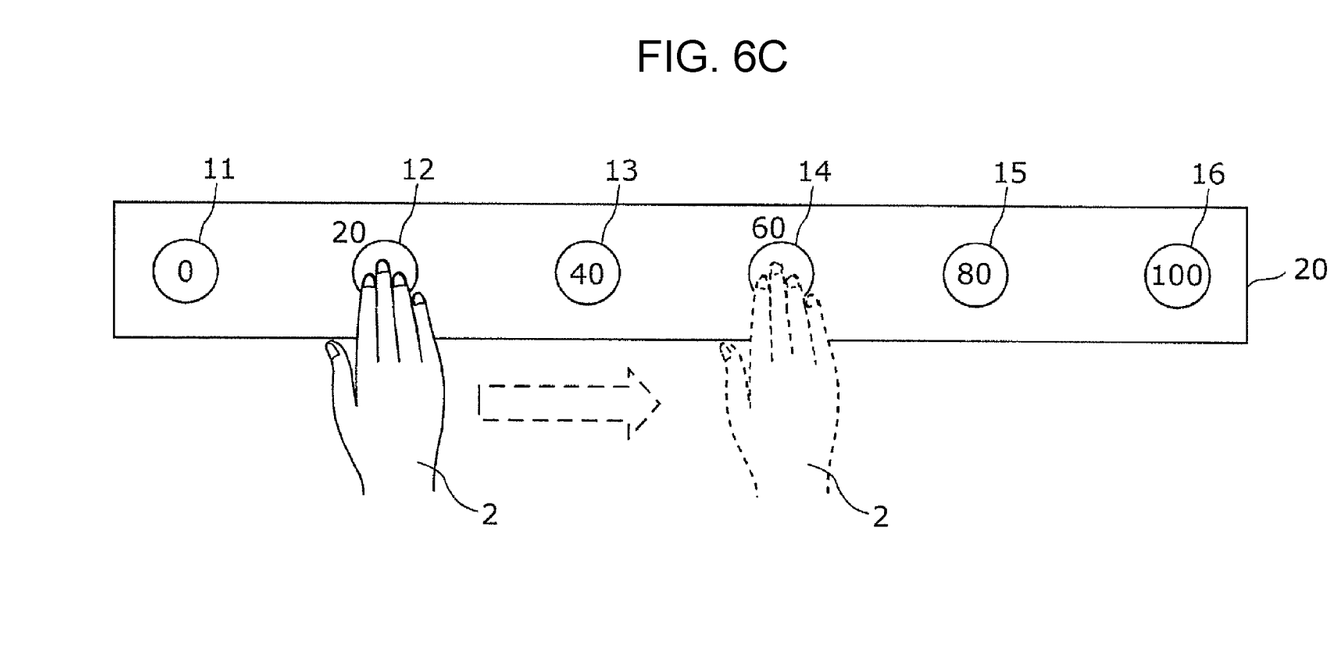
FIG. 6C is a diagram showing examples of level values assigned to the plurality of sensors of the control switch according to Embodiment 1 in a case where the moving velocity of the physical object is normal.

FIG. 6C is a diagram showing examples of level values assigned to the plurality of sensors 10 of the control switch 1 according to Embodiment 1 in a case where the moving velocity v of the physical object 2 is normal (equal to or higher than v1 and lower than or equal to v2).

A comparison between FIG. 4 and FIG. 6C shows that the level intervals are not changed in a case where the moving velocity v is equal to or higher than the first velocity v1 and lower than or equal to the second velocity v2. For this reason, with the level intervals of "20" maintained, the control circuit 50 causes the piece of equipment 3 to operate at an operating level corresponding to the level value of "20" assigned to the sensor 12.

For example, when the physical object 2 slides over the sensor 13 first and then the sensor 14 as shown in FIG. 6C while maintaining the moving velocity v, the operating level of the piece of equipment 3 changes from a smaller level value of "40" to a larger level value of "60". This finally causes the piece of equipment 3 to operate according to the magnitude of the level value of "60" or, specifically, to light at a brightness of "60".

Thus, the assignment of level values is not changed in a case where the physical object 2 moves at a normal velocity. This prevents an unintended change of level values, thus allowing for higher operability.

3. Summary

As described above, a control switch 1 according to Embodiment 1 is a control switch that controls the operating level of a piece of equipment 3, including: three or more sensors 10 that sense a physical object 2, the plurality of sensors 10 being placed side by side and assigned a plurality of level values; an acquisition circuit 30 that acquires the moving velocity of the physical object along the direction in which the plurality of sensors 10 are arranged; a change circuit 40 that changes the assignment of the plurality of level values to the plurality of sensors 10 according to the moving speed; and a control circuit 50 that causes the piece of equipment 3 to operate at an operating level corresponding to the level value assigned to that one of the sensors 10 which has sensed the physical object 2.

This changes the level values assigned to the plurality of sensors 10, thus allowing for higher operability for control of the operating level of the piece of equipment 3. For example, the operating level can be controlled with high accuracy by assigning a large number of sensors a large number of level values in an operating range within which fine adjustments need to be made. Alternatively, a great change in operating level can be made with a small amount of operation by assigning a small number of sensors a small number of level values within a predetermined operating range. Thus, the control switch 1 allows for higher operability for control of the operating level of the piece of equipment 3.

Embodiment 2

The following describes a control switch 1 according to Embodiment 2. It should be noted that the control switch 1 according to Embodiment 2 is identical in configuration to the control switch 1 according to Embodiment 1. The following mainly describes an operation of the control switch 1 according to Embodiment 2.

Figure 7:
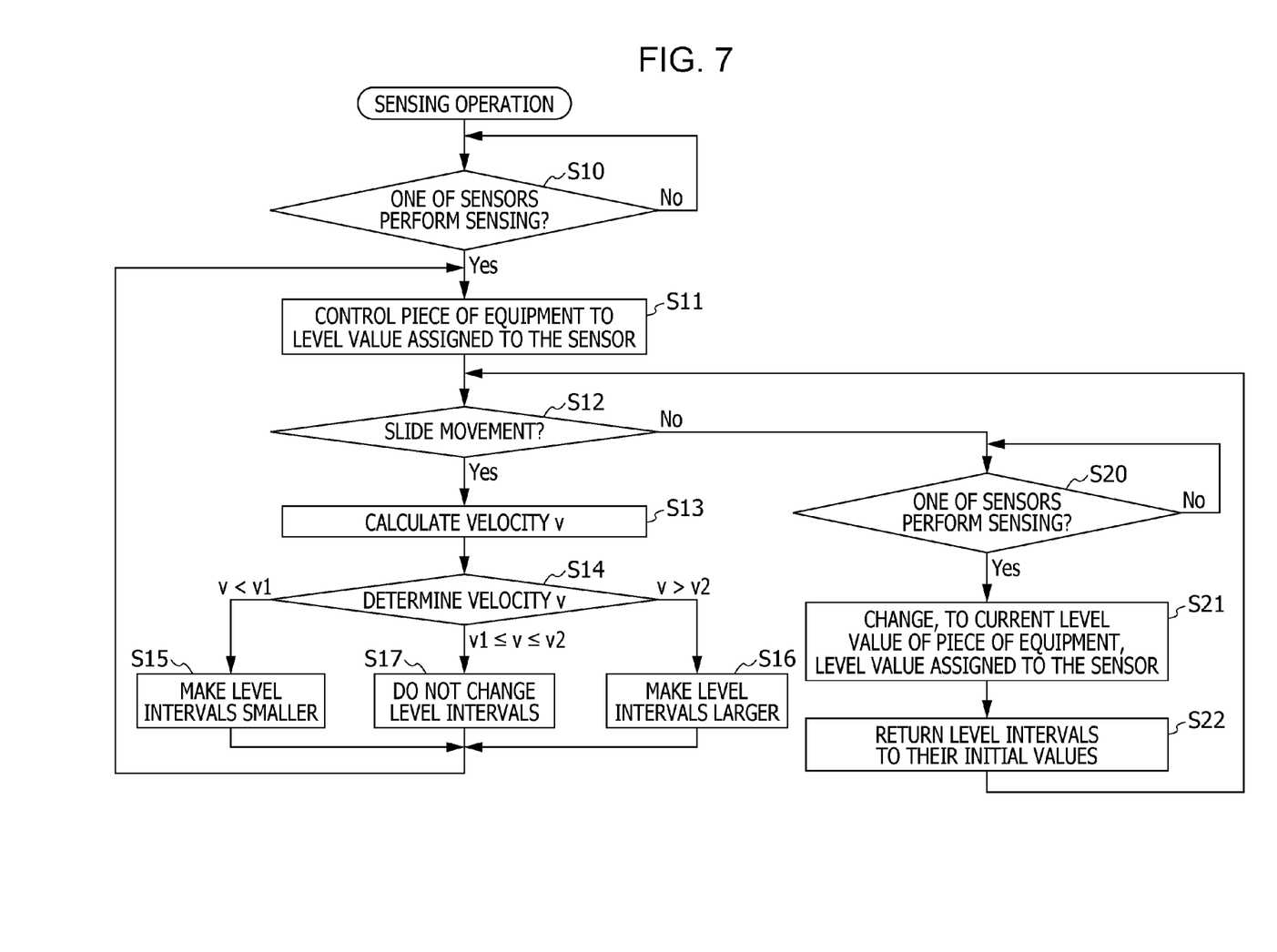
FIG. 7 is a flow chart showing an operation of a control switch according to Embodiment 2.

FIG. 7 is a flow chart showing the operation of the control switch 1 according to Embodiment 2. As shown in FIG. 7, the operation of the control switch 1 according to Embodiment 2 differs from the operation (see FIG. 5) of the control switch 1 according to Embodiment 1 in a case where it is determined that the physical object 2 is not making a slide movement (No in S12).

The term "case where the physical object 2 is not making a slide movement (No in S12)" means a case where an adjacent sensor did not sense the physical object 2 within a predetermined period. A possible example of the case is one where the user tries to adjust the operating level of the piece of equipment 3 again a while after he/she adjusted the operating level once.

In this case, the control switch 1 waits for one of the sensors 10 to sense the physical object 2 (No in S20). In a case where one of the sensor 10 has sensed the physical object 2 (Yes in S20), the change circuit 40 changes the level value assigned to the sensor 10 to the current level value of the piece of equipment 3 (S21). Then, the change circuit 40 returns the level intervals to their initial values and assign level values to the other sensors (S22).

After that, the process returns to step S12, and in a case where the physical object 2 is making a slide movement (Yes in S12), the level intervals are changed in the same manner as in Embodiment 1.

In the following, specific examples of the operation shown in FIG. 7 are described with reference to FIGS. 8A to 8D. FIGS. 8A to 8D are each a diagram showing examples of level values that the control switch 1 according to Embodiment 2 changes according to a movement of the physical object 2.

Figure 8A:
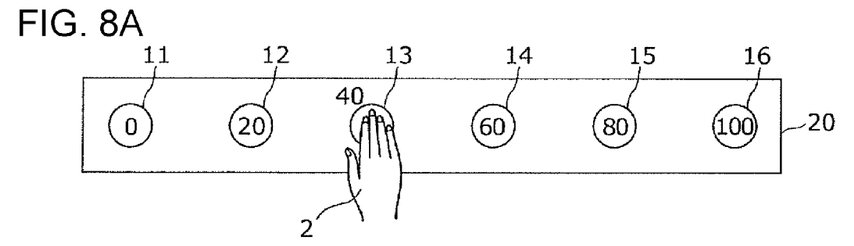
FIG. 8A is a diagram showing examples of level values that the control switch according to Embodiment 2 changes according to a movement of a physical object.

Here, first, as shown in FIG. 8A, the sensor 13 senses the physical object 2, whereby the piece of equipment 3 operates at a level value of "40", i.e. lights at brightness of "40". After that, assume a case (No in S12) where none of the sensors 10 has sensed the physical object 2 for a predetermined period or longer. In this case, the piece of equipment 3 continues to operate at the level value "40" for the predetermined period or longer.

Figure 8B:
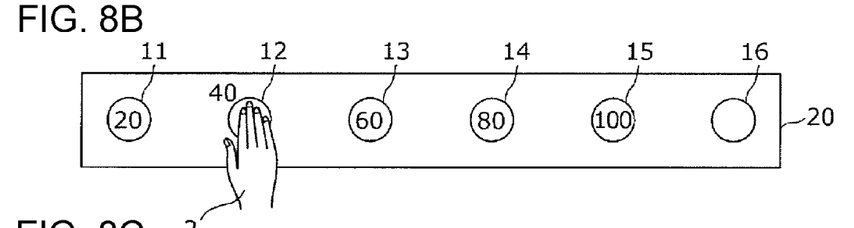
FIG. 8B is a diagram showing examples of level values that the control switch according to Embodiment 2 changes according to a movement of the physical object.

Next, as shown in FIG. 8B, when the sensor 12 has sensed the physical object 2 (Yes in S20), the change circuit 40 assigns the sensor 12 the level value of "40", at which the piece of equipment 30 is operating (S21). Furthermore, the change circuit 40 assigns level values to the sensors 11, 13, 14, 15, and 16 other than the sensor 12, respectively, so that the level intervals become "20" (S22).

As a result of this, the sensors 11, 13, 14, and 15 are assigned level values "20", "60", "80", and "100", respectively. It should be noted that the sensor 16 does not need to be assigned a level value or may be assigned a level value of "100", which is the maximum value.

Figure 8C:
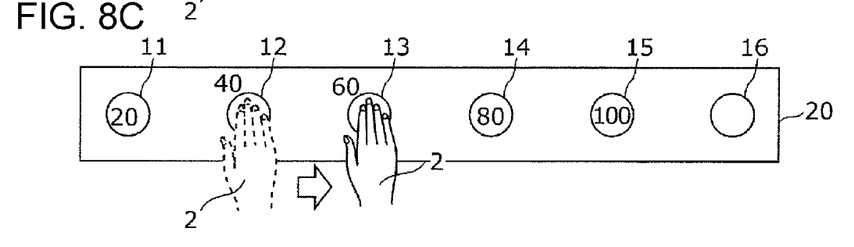
FIG. 8C is a diagram showing examples of level values that the control switch according to Embodiment 2 changes according to a movement of the physical object.

As shown in FIG. 8C, in a case where the physical object 2 goes on to slide (Yes in S12), the moving velocity v is determined in the same manner as in Embodiment 1. As one example, a case is described here where the moving speed v is lower than the first velocity v1.

Figure 8D:
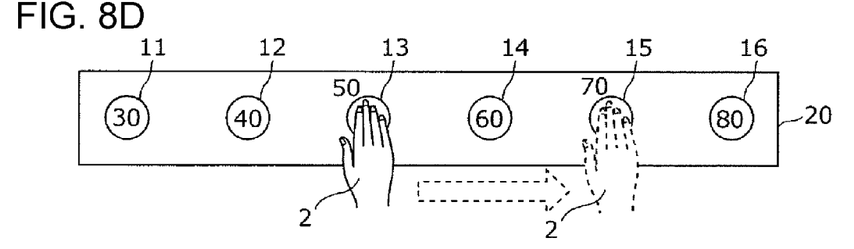
FIG. 8D is a diagram showing examples of level values that the control switch according to Embodiment 2 changes according to a movement of the physical object.

In this case, as shown in FIG. 8D, the change circuit 40 changes the level intervals to "10" (S15). As a result of this, the sensor 13 is assigned a level value of "50", whereby the control circuit 50 causes the piece of equipment 3 to operate at an operating level corresponding to the level value of "50". When the physical object 2 goes on to slide over the sensor 14 first and then the sensor 15, the operating level of the piece of equipment 3 changes from a smaller level value of "60" to a larger level value of "70". This finally causes the piece of equipment 3 to operate according to the magnitude of the level value of "70" or, specifically, to light at a brightness of "70".

As described above, the control switch 1 according to Embodiment 2 is configured such that when one of the sensors 10 has sensed the physical object 2 in a case where the piece of equipment 3 continues to operate at a predetermined operating level for a predetermined period or longer, the change circuit 40 assigns the sensor a level value corresponding to the predetermined operating level.

As a result of this, in a case where the sensor has sensed the physical object 2, the sensor is assigned a level value corresponding to the current operating level. This makes it possible to prevent a sudden great change in operating level. That is, this makes it possible to prevent an unintended change in operating level at the time of an operation resumption.

Modification

Figure 9:
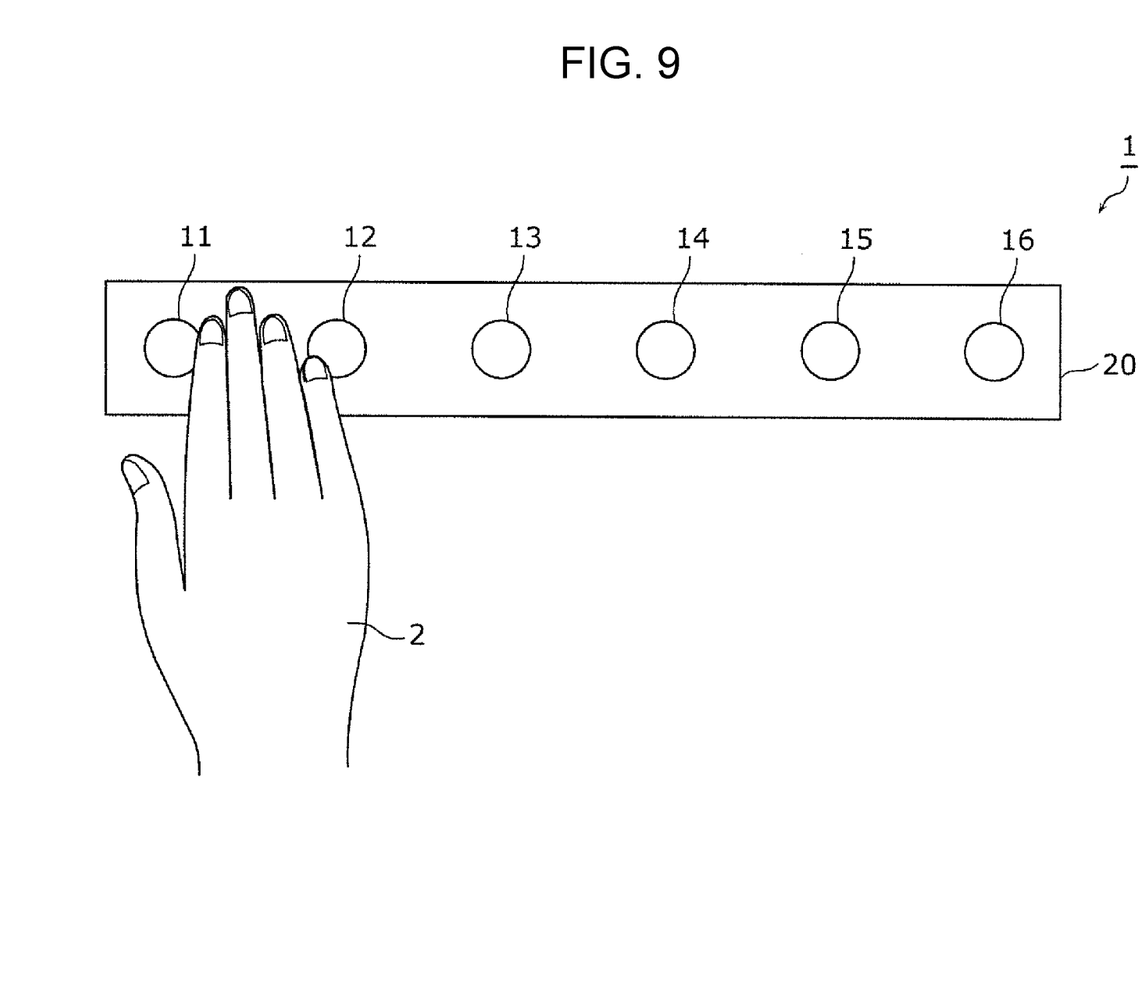
FIG. 9 is a diagram showing how a plurality of sensors of a control switch according to a modification sense a physical object at the same time.

In the following, a modification of the control switch according to Embodiment 2 described above is described with reference to FIG. 9. FIG. 9 is a diagram showing how a plurality of sensors 10 of the control switch 1 according to the present modification sense a physical object 2 at the same time.

Embodiments 1 and 2 have described a case where the sensing ranges of the plurality of the sensors 10 do not overlap and the physical object 2 does not enter the plurality of sensing ranges. On the other hand, it is conceivable that, as shown in FIG. 9, the physical object 2 may be present across the sensing ranges of a plurality of sensors 10.

In the present modification, in a case where two of the sensors 10 have sensed the physical object 2, the control circuit 50 causes the piece of equipment 3 to operate at an operating level corresponding to the average of two level values assigned to the two sensors. It should be noted that the term "same time" as used herein means an amount of time that is so small as to be deemed to be exactly the same time or substantially the same time.

Thus, the control switch 1 according to the present modification is configured such that in a case where two of the sensors 10 have sensed the physical object 2 at the same time, the control circuit 50 causes the piece of equipment 3 to operate at an operating level corresponding to the average of two level values assigned to the two sensors.

This makes it possible to adjust the operating level with higher accuracy while reducing the number of sensors.

It should be noted that in a case where three or more sensors have sensed the physical object 2 at the same time, the control circuit 50 may also cause the piece of equipment 3 to operate at an operating level corresponding to the average of three or more level values assigned to the three or more sensors.

Further, in a case where the sensors are capacitive sensors, a greater change in capacitance means that the physical object 2 is closer to the sensors. Therefore, the control circuit 50 may cause the piece of equipment 3 to operate at an operating level according to a value obtained by adding two level values together with weighting on the basis of the magnitude of changes in capacitance of two sensors.

For example, assume a case where the sensor 12 and the sensor 13 have sensed the physical object 2 at the same time and the physical object 2 is closer to the sensor 13 than to the sensor 12. In this case, the amount of change in capacitance of the sensor 13 is larger than the amount of change in capacitance of the sensor 12, so that the control circuit 50 may assign a greater weight to a level value assigned to the sensor 13 than to a level value assigned to the sensor 12 and add the level values together.

Other Embodiments

In the foregoing, embodiments of a control switch according to one or more aspects have been described. However, the present disclosure is not limited to these embodiments. An embodiment obtained by subjecting any of these embodiments to various modifications that persons skilled in the art can conceive of and an embodiment obtained by combining constituent elements of different embodiments are encompassed in the scope of the present disclosure, provided such embodiments do not depart from the spirit of the present disclosure.

For example, although the embodiments described above have described an example where the plurality of sensors 10 are assigned a plurality of level values at equal level intervals, this does not imply any limitation. The plurality of sensors 10 may be placed at level intervals each of which becomes larger or smaller than the immediately preceding one along the direction in which the plurality of sensors 10 are arranged. The changed level intervals do not need to be equal level intervals, either. For example, each of the changed level intervals may become larger or smaller than the immediately preceding one along the direction in which the plurality of sensors 10 are arranged. Further, for example, the plurality of sensors 10 do not need to be assigned a plurality of level values in ascending or descending order.

Further, for example, although the embodiments described above use the first velocity v1 and the second velocity v2 in determining the moving velocity v, this does not imply any limitation. In a case where the moving velocity v is lower than a predetermined velocity, the change circuit 40 may make the level intervals smaller, and in other cases, the change circuit 40 does not need to change the level intervals. Further, in a case where the moving velocity v is higher than the predetermined velocity, the change circuit 40 may change the level intervals, and in other cases, the change circuit 40 does not need to change the level value.

Further, the present disclosure can be achieved not only as the control switch 1 but also as a program including, as steps, processes that are performed by the acquisition circuit 30, the change circuit 40, and the control circuit 50, which are constituent elements of the control switch 1, or as a storage medium such as a computer-readable DVD (digital versatile disc) storing the program.

It should be noted that the general or specific embodiments may be implemented as a system, an apparatus, an integrated circuit, a computer program, a computer-readable storage medium, or any selective combination thereof.

Further, each of the embodiments described above may be subjected to various changes, substitutions, additions, omissions, and the like in the scope of the claims or the scope of equivalents of the claims.

What is claimed is:

1. A control switch for controlling a level of an operation of an apparatus among operating levels including first, second, and third operating levels, comprising:
   sensors each of which, in operation, senses an object,
      the sensors including first, second, and third sensors,
      the first, second, and third sensors being arranged in this order at intervals from each other along one direction,
      the first, second, and third sensors being respectively assigned a first level value corresponding to the first operating level, a second level value corresponding to the second operating level, and a third level value corresponding to the third operating level,
      the first, second, and third level values being included in level values each corresponding to any of the operating levels,
      the first, second, and third level values being values that are in ascending or descending order;
   an acquisition circuit that, in operation, acquires a moving velocity of the object along the direction with the first, second, and third sensors;
   a change circuit that, in operation, changes at least two of the first, second, and third level values according to the moving velocity; and
   a control circuit that, in operation, causes the apparatus to operate at an operating level corresponding to the level value assigned to one of the first, second, and third sensors which has sensed the object, wherein:
   (i) when the moving velocity is lower than a first velocity, the change circuit changes at least two of the first, second, and third level values so that a first level interval between the first level value and the second level value and a second level interval between the second level value and the third level value both become smaller;
   (ii) when the moving velocity is higher than a second velocity that is higher than the first velocity, the change circuit changes at least two of the first, second, and third level values so that the first level interval and the second level interval both become larger; and
   (iii) when the moving velocity is equal to or higher than the first velocity and lower than or equal to the second velocity, the change circuit does not change the first, second, or third level value.

2. The control switch according to claim 1, wherein when the level of the operation of the apparatus continues to be one of the operating levels for a predetermined period or longer, the change circuit further assigns one of the level values which corresponds to the one of the operating levels to the one of the first, second, and third sensor which has sensed the object.

3. The control switch according to claim 1, wherein when two of the sensors have sensed the object at the same time, the control circuit causes the apparatus to operate according to an average of two of the level values which are assigned to the two of the sensors.

4. The control switch according to claim 1, wherein the acquisition circuit, in operation, calculates the moving velocity using a time from a sensing of the object by the first sensor to a sensing of the object by the second sensor and a distance from the first sensor to the second sensor.

5. The control switch according to claim 1, wherein the first, second, and third sensors are placed at regular intervals, and
   the first interval and the second interval are equal to each other.

6. The control switch according to claim 1, wherein the first, second, and third sensors are aligned in a line.

7. The control switch according to claim 1, wherein each of the sensors includes an electrode that, in operation, detects a change in capacitance generated between the object and each of the sensors.

8. The control switch according to claim 1, wherein each of the sensors includes a light receiver that, in operation, receives infrared radiation reflected or emitted by the object.

* * * * *